(12) United States Patent
Ninomiya et al.

(10) Patent No.: US 10,871,619 B2
(45) Date of Patent: Dec. 22, 2020

(54) CASSETTE ASSEMBLY FOR A PLURAL OF FIBER OPTIC RECEPTACLES

(71) Applicant: Senko Advanced Components Inc, Marlborough, MA (US)

(72) Inventors: Takuya Ninomiya, Natick, MA (US); Benjamin Lee, Sudbury, MA (US); Kim Man Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/387,427

(22) Filed: Apr. 17, 2019

(65) Prior Publication Data

US 2019/0243083 A1   Aug. 8, 2019

Related U.S. Application Data

(63) Continuation-in-part of application No. 16/387,373, filed on Apr. 17, 2019, now Pat. No. 10,725,248, and a continuation-in-part of application No. 15/979,596, filed on May 15, 2018, now Pat. No. 10,416,394, which is a continuation-in-part of application No. 15/881,309, filed on Jan. 26, 2018, now Pat. No. 10,185,100.

(60) Provisional application No. 62/675,463, filed on May 23, 2018, provisional application No. 62/658,806, filed on Apr. 17, 2018, provisional application No. 62/581,961, filed on Nov. 6, 2017, provisional application No. 62/546,920, filed on Aug. 17, 2017, provisional application No. 62/457,150, filed on Feb. 9, 2017, provisional application No. 62/452,147, filed on Jan. 30, 2017.

(51) Int. Cl.
*G02B 6/44* (2006.01)
*G02B 6/38* (2006.01)

(52) U.S. Cl.
CPC ........ *G02B 6/4453* (2013.01); *G02B 6/3825* (2013.01); *G02B 6/3897* (2013.01)

(58) Field of Classification Search
CPC ... G02B 6/4453; G02B 6/3825; G02B 6/3897
USPC .......................................................... 439/79
See application file for complete search history.

(56) References Cited

U.S. PATENT DOCUMENTS

| | | | | |
|---|---|---|---|---|
| 5,887,095 A * | 3/1999 | Nagase | ............... | G02B 6/3825 385/147 |
| 6,193,420 B1 * | 2/2001 | Sikorski, Jr. | ......... | G02B 6/3825 174/67 |
| 6,352,375 B1 * | 3/2002 | Shimoji | ............... | G02B 6/4296 385/139 |
| 6,364,537 B1 * | 4/2002 | Maynard | .............. | G02B 6/3831 385/55 |
| 6,471,414 B2 * | 10/2002 | Carberry | .............. | G02B 6/3807 385/134 |

(Continued)

*Primary Examiner* — Alexander Gilman
(74) *Attorney, Agent, or Firm* — Edward S. Jarmolowicz, Esq.

(57) ABSTRACT

A cassette with a first and second end. Each end may have a plural of receptacles capable of accepting one or more connector types. The cassette may have a pair of latches on opposing sides, or a latch and flange to secure cassette within a panel or support structure. The cassette is configured to accept a first connector type on the first side and a second connector type on the second side of the cassette, so the first and second connector are opposing and in communication.

7 Claims, 16 Drawing Sheets

(56) References Cited

U.S. PATENT DOCUMENTS

| | | | |
|---|---|---|---|
| 6,682,228 B2* | 1/2004 | Rathnam | G02B 6/3825 385/55 |
| 6,685,362 B2* | 2/2004 | Burkholder | G02B 6/3825 385/78 |
| 6,688,780 B2* | 2/2004 | Duran | G02B 6/3825 385/76 |
| 6,935,789 B2* | 8/2005 | Gross, III | G02B 6/3847 385/59 |
| 6,985,665 B2 | 1/2006 | Baechtle | |
| 7,325,980 B2* | 2/2008 | Pepe | G02B 6/3879 385/55 |
| 7,371,082 B2* | 5/2008 | Zimmel | G02B 6/3871 439/78 |
| 7,824,113 B2* | 11/2010 | Wong | G02B 6/387 385/53 |
| 7,837,395 B2* | 11/2010 | Lin | G02B 6/3825 385/134 |
| 7,976,346 B2* | 7/2011 | Guy | H01R 13/2421 439/638 |
| 8,083,450 B1* | 12/2011 | Smith | F16B 37/044 411/112 |
| 8,192,091 B2* | 6/2012 | Hsu | G02B 6/3825 385/147 |
| 8,270,796 B2* | 9/2012 | Nhep | G02B 6/3825 385/135 |
| 8,376,629 B2 | 2/2013 | Cline et al. | |
| 8,444,327 B2* | 5/2013 | Chen | G02B 6/3825 385/75 |
| 8,734,027 B2* | 5/2014 | Zoss | G02B 6/3825 385/139 |
| 8,899,845 B2* | 12/2014 | Gallegos | G02B 6/3826 385/81 |
| 8,998,505 B2* | 4/2015 | Motofuji | G02B 6/3879 385/78 |
| 9,261,654 B2* | 2/2016 | Murphy | G02B 6/3825 |
| 9,297,962 B2* | 3/2016 | Lee | G02B 6/3825 |
| 9,310,569 B2* | 4/2016 | Lee | G02B 6/3825 |
| 9,588,305 B2* | 3/2017 | Seki | G02B 6/3893 |
| 9,618,702 B2* | 4/2017 | Takano | G02B 6/3825 |
| 9,739,955 B2* | 8/2017 | Lee | G02B 6/3893 |
| 9,869,825 B2* | 1/2018 | Bailey | G02B 6/3879 |
| 9,933,586 B1* | 4/2018 | Yang | G02B 6/3847 |
| 10,162,129 B2 | 12/2018 | Smith et al. | |
| 10,185,099 B2* | 1/2019 | Chang | G02B 6/3825 |
| 10,185,100 B2* | 1/2019 | Takano | G02B 6/3825 |
| 10,228,521 B2* | 3/2019 | Gniadek | H01R 13/506 |
| 10,234,636 B2* | 3/2019 | Burek | G02B 6/3825 |
| 10,261,270 B2* | 4/2019 | Kurashima | G02B 6/3879 |
| 10,295,755 B1* | 5/2019 | Zhou | G02B 6/3825 |
| 10,302,874 B2* | 5/2019 | Tong | G02B 6/38 |
| 10,302,875 B1* | 5/2019 | Yang | G02B 6/3874 |
| 10,444,444 B2* | 10/2019 | Ma | G02B 6/3893 |
| 10,502,903 B1* | 12/2019 | Wang | G02B 6/3825 |
| 10,520,689 B2* | 12/2019 | Gniadek | H01R 13/6271 |
| 10,539,748 B2* | 1/2020 | Gniadek | H01R 13/629 |
| 2002/0159712 A1* | 10/2002 | Holmquist | G02B 6/3825 385/70 |
| 2002/0172467 A1* | 11/2002 | Anderson | G02B 6/3825 385/53 |
| 2003/0063862 A1* | 4/2003 | Fillion | G02B 6/3825 385/53 |
| 2003/0157825 A1* | 8/2003 | Kane | H01R 13/641 439/352 |
| 2005/0111796 A1* | 5/2005 | Matasek | G02B 6/3825 385/55 |
| 2006/0160429 A1* | 7/2006 | Dawiedczyk | H01R 12/7005 439/676 |
| 2007/0098329 A1* | 5/2007 | Shimoji | G02B 6/3893 385/76 |
| 2007/0232115 A1* | 10/2007 | Burke | H01R 13/6272 439/344 |
| 2008/0056646 A1* | 3/2008 | Terakura | G02B 6/3831 385/72 |
| 2008/0069501 A1* | 3/2008 | Mudd | G02B 6/3825 385/75 |
| 2008/0267566 A1* | 10/2008 | En Lin | G02B 6/3825 385/53 |
| 2009/0028507 A1* | 1/2009 | Jones | G02B 6/3825 385/56 |
| 2009/0175580 A1* | 7/2009 | Chen | G02B 6/3817 385/75 |
| 2009/0290838 A1* | 11/2009 | Lin | G02B 6/3825 385/55 |
| 2010/0239220 A1* | 9/2010 | Lin | G02B 6/3825 385/134 |
| 2010/0322561 A1* | 12/2010 | Lin | G02B 6/3825 385/55 |
| 2011/0044583 A1* | 2/2011 | Dalton | G02B 6/3825 385/53 |
| 2011/0274437 A1* | 11/2011 | Jones | G02B 6/3879 398/141 |
| 2012/0155810 A1* | 6/2012 | Nakagawa | G02B 6/3878 385/78 |
| 2012/0269485 A1* | 10/2012 | Haley | G02B 6/3887 385/78 |
| 2013/0071067 A1* | 3/2013 | Lin | G02B 6/3825 385/75 |
| 2013/0089995 A1* | 4/2013 | Gniadek | H01R 13/6335 439/152 |
| 2013/0183018 A1* | 7/2013 | Holmberg | G02B 6/3825 385/135 |
| 2013/0195407 A1* | 8/2013 | Imaki | G02B 6/36 385/84 |
| 2013/0216188 A1* | 8/2013 | Lin | G02B 6/3893 385/77 |
| 2014/0016901 A1* | 1/2014 | Lambourn | G02B 6/3895 385/75 |
| 2014/0016902 A1* | 1/2014 | Pepe | G02B 6/3893 385/76 |
| 2014/0023322 A1* | 1/2014 | Gniadek | G02B 6/3825 385/56 |
| 2014/0133808 A1* | 5/2014 | Hill | G02B 6/3826 385/81 |
| 2014/0169727 A1* | 6/2014 | Veatch | G02B 6/2726 385/11 |
| 2015/0177463 A1* | 6/2015 | Lee | G02B 6/3897 385/76 |
| 2016/0116685 A1* | 4/2016 | Wong | G02B 6/3893 385/56 |
| 2016/0131849 A1* | 5/2016 | Takano | G02B 6/3825 385/60 |
| 2016/0154190 A1* | 6/2016 | Lin | G02B 6/3893 385/76 |
| 2016/0259135 A1* | 9/2016 | Gniadek | G02B 6/3831 |
| 2017/0276881 A1* | 9/2017 | Ott | G02B 6/3825 |
| 2018/0052287 A1 | 2/2018 | Smith et al. | |
| 2018/0259717 A1* | 9/2018 | Takano | G02B 6/3893 |
| 2018/0292618 A1* | 10/2018 | Chang | G02B 6/3898 |
| 2019/0195407 A1* | 6/2019 | Sprenger | F16L 37/08 |

* cited by examiner

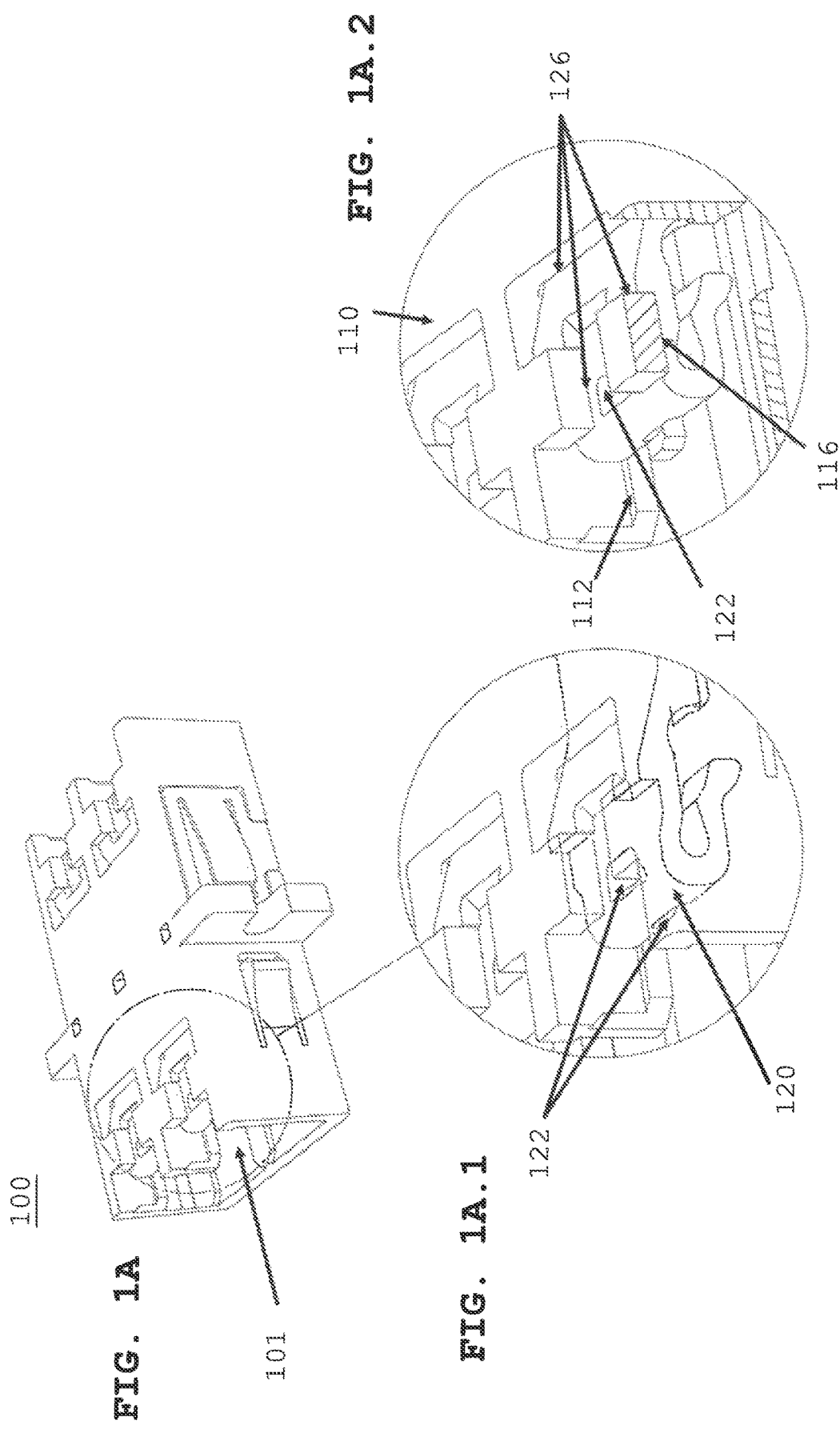

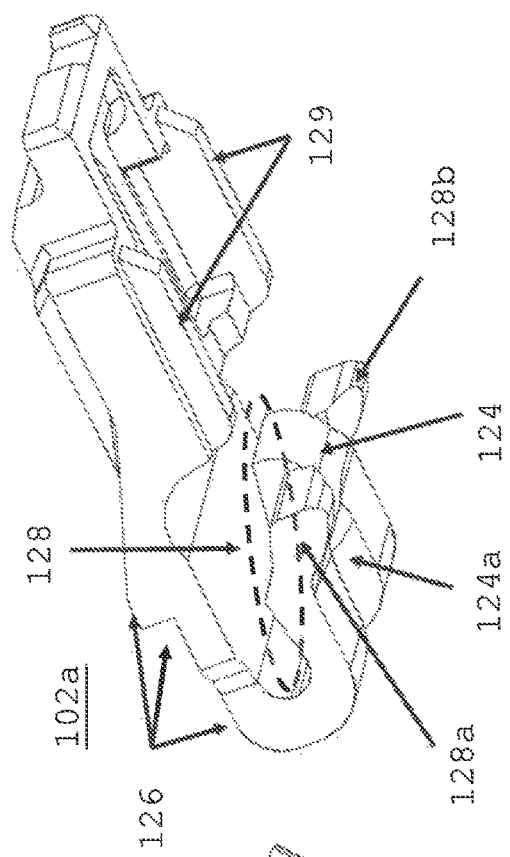
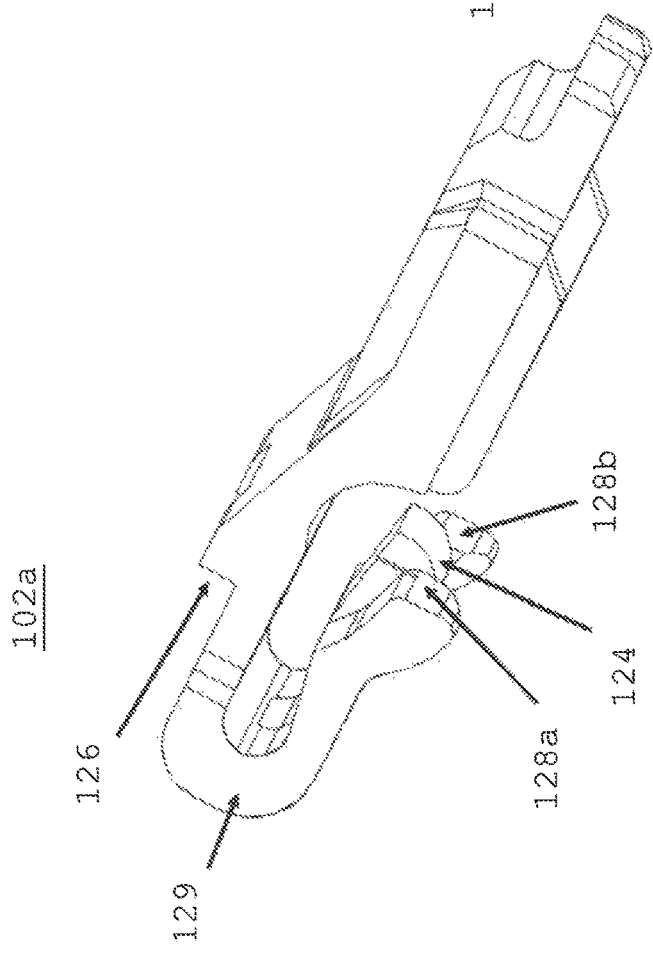
FIG. 1B.2
FIG. 1B.1

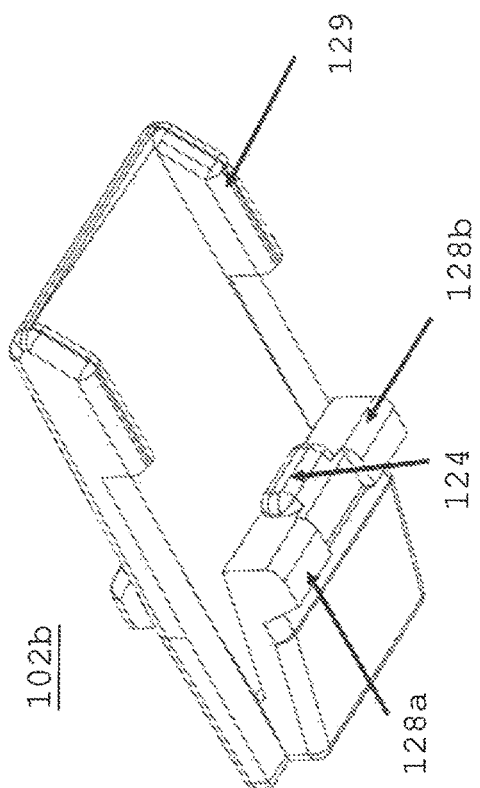
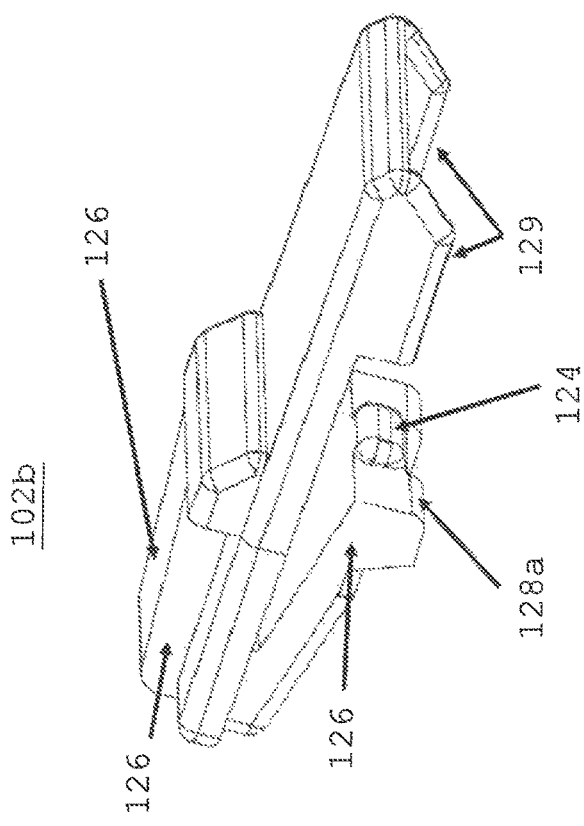
FIG. 1C.2
FIG. 1C.1

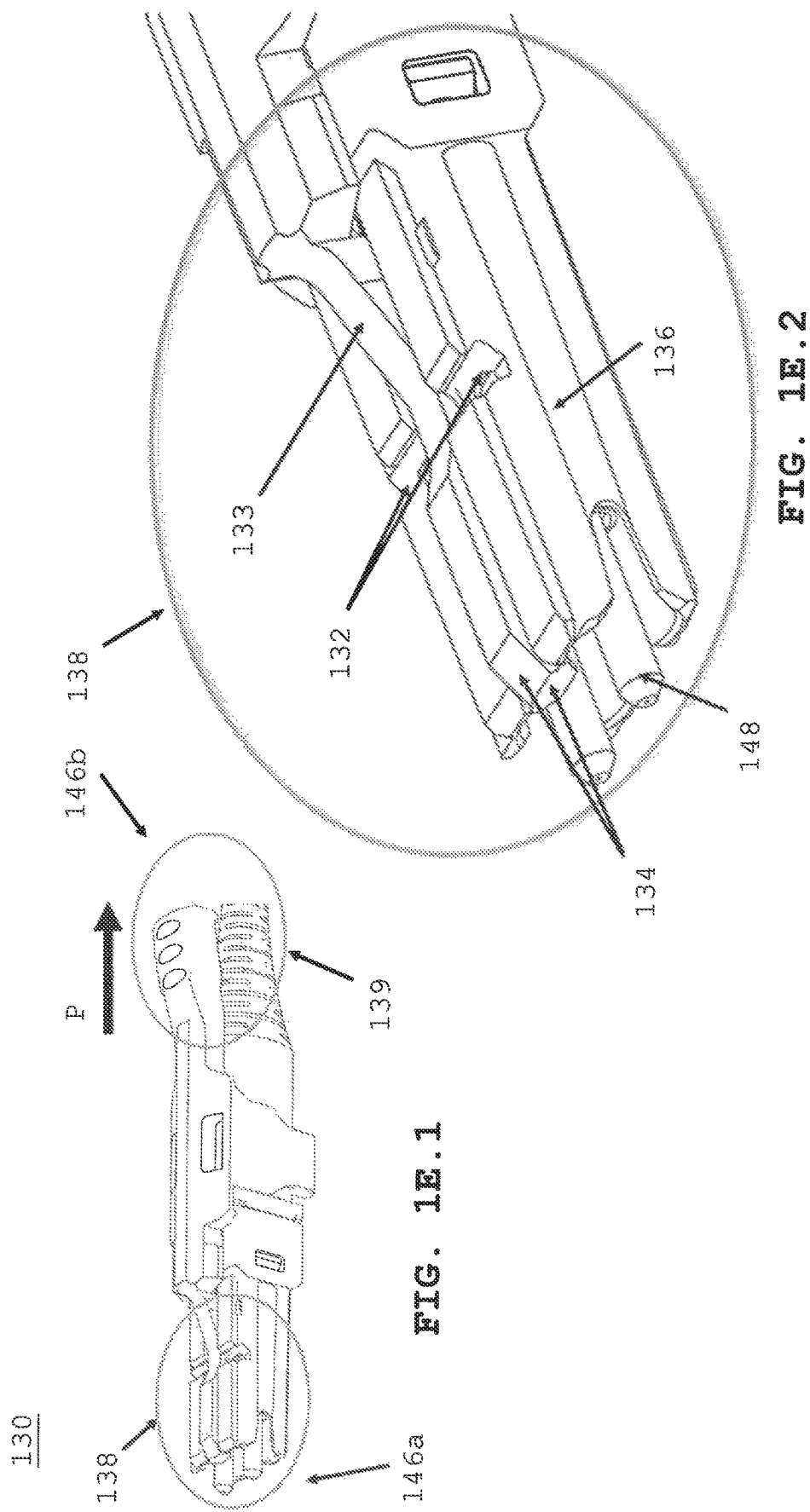

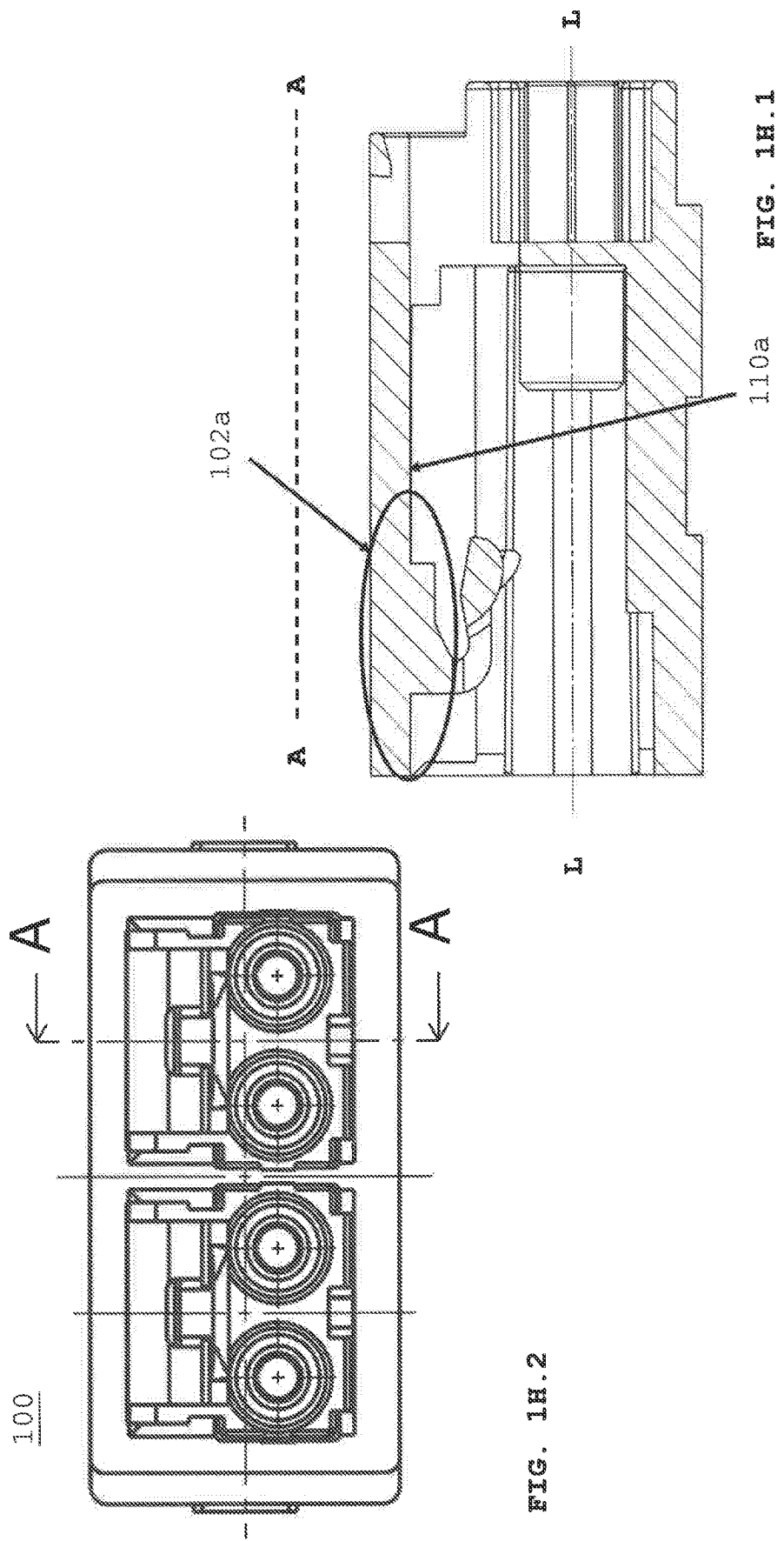

CASSETTE ASSEMBLY FOR A PLURAL OF FIBER OPTIC RECEPTACLES

CROSS REFERENCE TO RELATED APPLICATIONS

This application claims priority under 35 USC 119(e) to non-provisional application Ser. No. 62/675,463 filed on May 23, 2018, and further claims priority as a continuation-in-part to U.S. patent application Ser. No. 16/387,373, filed on Apr. 17, 2019 entitled "FIBER OPTIC RECEPTACLE WITH INTEGRATED DEVICE THEREIN INCORPORATING A BEHIND-THE-WALL FIBER OPTIC RECEPTACLE" which further claims priority as a continuation-in-part application to U.S. patent application Ser. No. 15/979,596, filed May 15, 2018, entitled "Fiber Optic Receptacle With Integrated Device Therein", which further claims priority to provisional 62/658,806 filed on Apr. 17, 2018, and application Ser. No. 15/979,596 is as a continuation-in-part to U.S. patent application Ser. No. 15/881,309 filed on Jan. 26, 2018, now U.S. Pat. No. 10,185,100 entitled "Modular Connector and Adapter Assembly Using a Removable Anchor Device," issued Jan. 22, 2019, which claims priority to U.S. Provisional Application No. 62/147,150, filed on Feb. 9, 2017, entitled "Optical Fiber Connector,", and to U.S. Provisional Application No. 62/546,920 filed Aug. 17, 2017, entitled "Narrow Width Adapters and Connectors with Modular Latching Arm,", and to U.S. Provisional Application No. 62/452,147, filed Jan. 30, 2017, entitled "Narrow Width Adapters and Connectors with Modular Latching Arm," and to U.S. Provisional No. 62/581,961 filed Nov. 6, 2017, entitled "Narrow Width Adapters and Connectors with Modular Latching Arm," each of which is incorporated by reference in its entirety.

FIELD OF THE INVENTION

The present invention relates to fiber optic connectors and receptacles, and more particularly, to a cassette capable of holding a plural of fiber optic receptacles for accepting a plural of the same or different fiber optic connectors.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a cassette a first end having a plural of receptacles capable of accepting fiber optic connectors of more than one type, such as CS® push/pull; LG or SC or MPO (multi-push on/off). A second end is configured with a pull-tab handle that accepts a plural of fiber optic strands or cables with optical fibers (e.g. strands) therein, or a plural of corresponding receptacles that are aligned with the first end of the cassette.

A receptacle is configured to accept a fiber optic connector, and secure said connector therein. An auxiliary device such as a hook or latch may be within a receptacle for securing said connector therein. Corresponding structure on a connector may be provided to assist in securing and locking said connector within a receptacle. The cassette may have a top hinged cover with outer latches to be received in a patch panel. A patch panel has a one or more cassettes that accept fiber optic connectors to interconnect opposing groups of fiber optic cabling that may between rooms. A bottom housing accepts a top housing or cover, and the bottom housing may also contain one or more single or duplex fiber optic adapters or receptacles. The other latches may be clips, hooks or a similar fastener to secure the cassette opposite corresponding fiber optic connectors. In another embodiment, a cassette can have one latch with a flange to secure the cassette with a patch panel.

BRIEF DESCRIPTION OF THE DRAWINGS

Embodiments of the invention are described in more detail hereinafter with reference to the drawings, in which:

FIG. 1A depicts a fiber optic adapter with a plural of receptacles on either side each have a single, releasable and replaceable engagement device therein;

FIG. 1A.1 is a zoomed view of the engagement device inserted into a receptacle of FIG. 1A without a multi-fiber optic ferrule connector secured therein;

FIG. 1A.2 is a zoomed view of the device of FIG. 1A.1 illustrating engagement device secured in a receptacle where the engagement device makes contact and is supported within the adapter structure;

FIG. 1B.1 depicts a side perspective view of a unitary engagement device, that can be secured within adapter receptacle of FIG. 1A.1;

FIG. 1B.2 depicts a bottom, side perspective view of the unitary engagement device that can be secured within adapter receptacle of FIG. 1A.1;

FIG. 1C.1 depicts a side perspective view of another embodiment of a unitary engagement device that can be secured within adapter receptacle of FIG. 1A.1;

FIG. 1C.2 depicts a bottom, side perspective view of the second embodiment of a unitary engagement device that can be secured within adapter receptacle of FIG. 1A.1;

FIG. 1E.1 is a perspective of a CS® multi-fiber optic connector, having a push-pull tab, inserted into an adapter of FIG. 1A using an engagement device;

FIG. 1E.2 is a zoomed view of a proximal end of the multi-fiber optic connector of FIG. 1E.1;

FIG. 1H.1 depicts cross section of an adapter with an integrated engagement device;

FIG. 1H.2 depicts front view of fiber optic connectors latched within an adapter having an integrated engagement device therein;

DETAILED DESCRIPTION

Figure 1D:
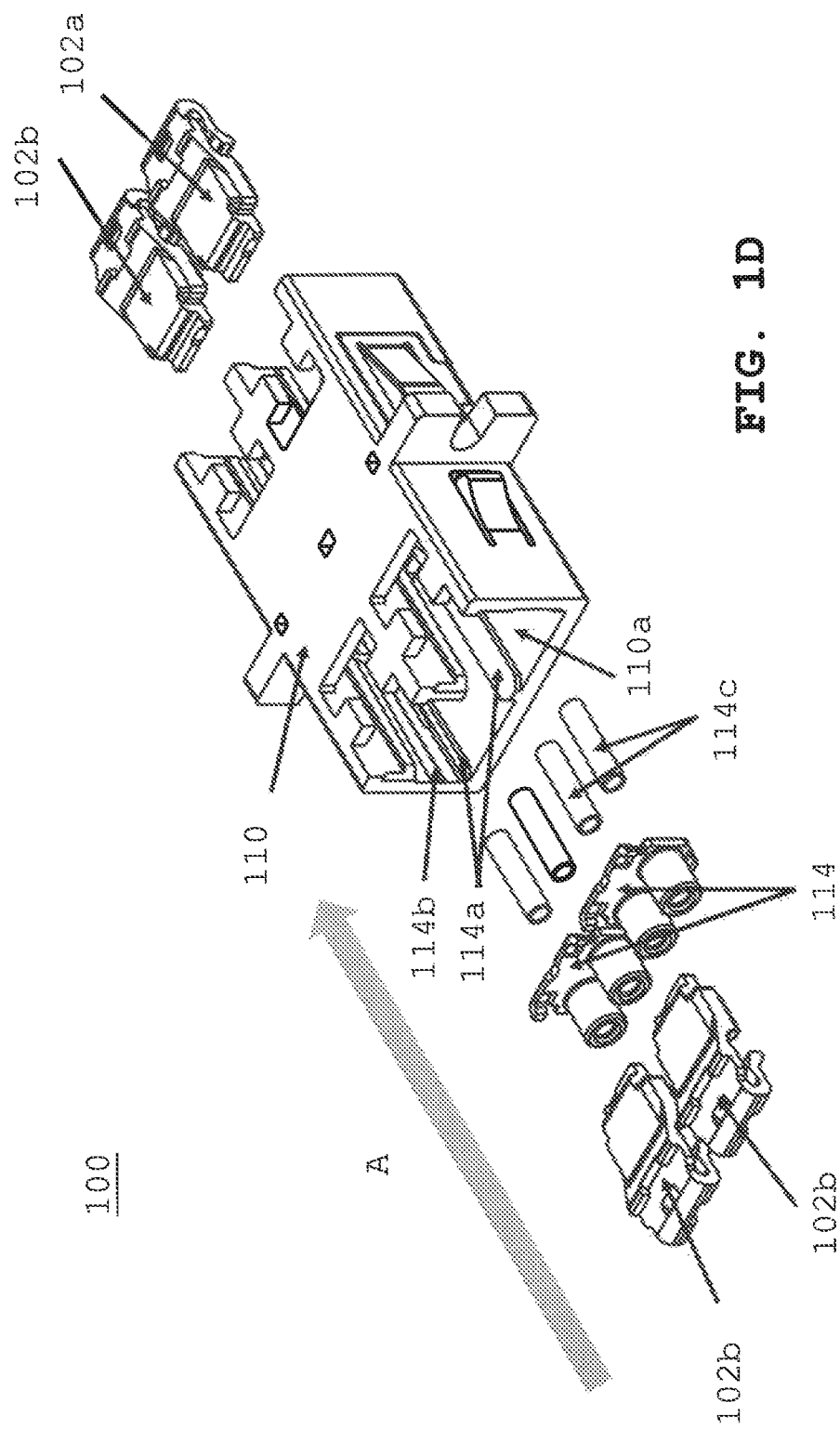
FIG. 1D is an exploded view of FIG. 1A.

In the following description, apparatuses for mating two multi-fiber optic ferrules and a multi-fiber optic ferrule with a multi-fiber optic connector and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

FIG. 1A depicts an embodiment of fiber optic adapter 100 with unitary engagement device 12C inserted into a receptacle 101 of adapter 100. Referring to FIG. 1A.1, the unitary engagement device has openings 122. The openings provide stress relief as the engagement device radius 129 reverses a plural of legs (128a, 128b), as shown in FIG. 1B.1 and FIG. 1B.2. The proximal end of connector 130 has widthwise recess 132, that accepts device legs (128a, 128b). Once the legs are in the recess, an attempt to pull the connector out of the adapter receptacle, the legs are captured in the recess. This prevents unintended removal of connector unless operator pulls on push-pull tab 139 (refer to FIG. 1E.1) as described herein. The recess is formed is shaped as a groove with a width to accept arm thickness. Upon pulling on the connector, not the push-pull tab, the legs resist removal of the connector. The legs retained the connector by providing an opposing force while contained in the recess.

Referring to FIG. 1A.2, a zoomed portion of adapter outer housing 110 cutouts illustrated contact or securing points 126 holding device 120 within receptacle. Cutout 116 on device 120 upper surface receives corresponding adapter housing structure.

FIGS. 1B.1 and 1C.1 depict embodiment of the unitary engagement device. Legs (128a, 128b) engage a corresponding widthwise recess 132 on a surface of a proximal end 146a of a push/pull connector 130, as shown as FIG. 1E.2. FIG. 1B.1 depicts one embodiment, 102a, of removable, replaceable engagement device 120. FIG. 1C.1 depicts another embodiment, 102b, of a removable, replaceable engagement device 120. The aforementioned engagement devices (102a, 102b) are formed as part of an inner receptacle port 110a of an adapter in the present invention. FIG. 1D is an exploded view of adapter 100 with housing 110, rails 114a, 114b that guides and aligns fiber optic connectors (130,140) within receptacle port of adapter 100. Engagement devices (102b, 102a) can be inserted in a receptacle port of adapter on either side.

FIG. 1E.1 depicts proximal end 146a is nearer a ferrule 148, while distal end 146b is nearer a boot/push-pull ab 146b. FIG. 1A.2 depicts adapter housing 110 with engagement device 120 inserted into a receptacle port. FIG. 1A.2 cross-section depicts engagement device contact points 126 that engage the adapter housing to prevent movement of engagement device upon inserting and removing a connector (not shown). FIGS. 1B.1-1C.1 depict engagement device contact points 126 engage opposing surfaces in the adapter inner housing to secure the engagement device within the adapter receptacle. FIG. 1B.2 and FIG. 1C.2 depict rails 129 that are supported on an inner rail support 112 (refer to FIG. 1A.2) within adapter receptacle 124.

FIG. 1E.1 depicts push-pull multi-fiber optic connector 130, with tab 139, that allows a user to release connector from receptacle by pulling on tab 139 in direction "P". To secure connector in a receptacle, engagement device (102a, 102b) is activated upon insertion of a proximal end of the connector into the receptacle. Referring to FIG. 1B.1, middle arm 124 contacts ramp 134 (refer to FIG. 1E.2), as the middle arm is raised a pair of outer arms or legs (128a, 128b) are raised. As the connector is further inserted into the receptacle, outer arm tension is released and the outer arms are retained within widthwise recess 132 of at the proximal end of the connector. This secures or latches the connector into the adapter receptacle. Once secured, the engagement device prevents longitudinal movement of the multi-fiber optic connector along longitudinal axis, from a first end to a second end of fiber optic adapter 100 inside the receptacle. This same operation for engagement device 102a, FIG. 1B.1 occurs for device 120b, FIG. 1C.1.

Figure 1F:
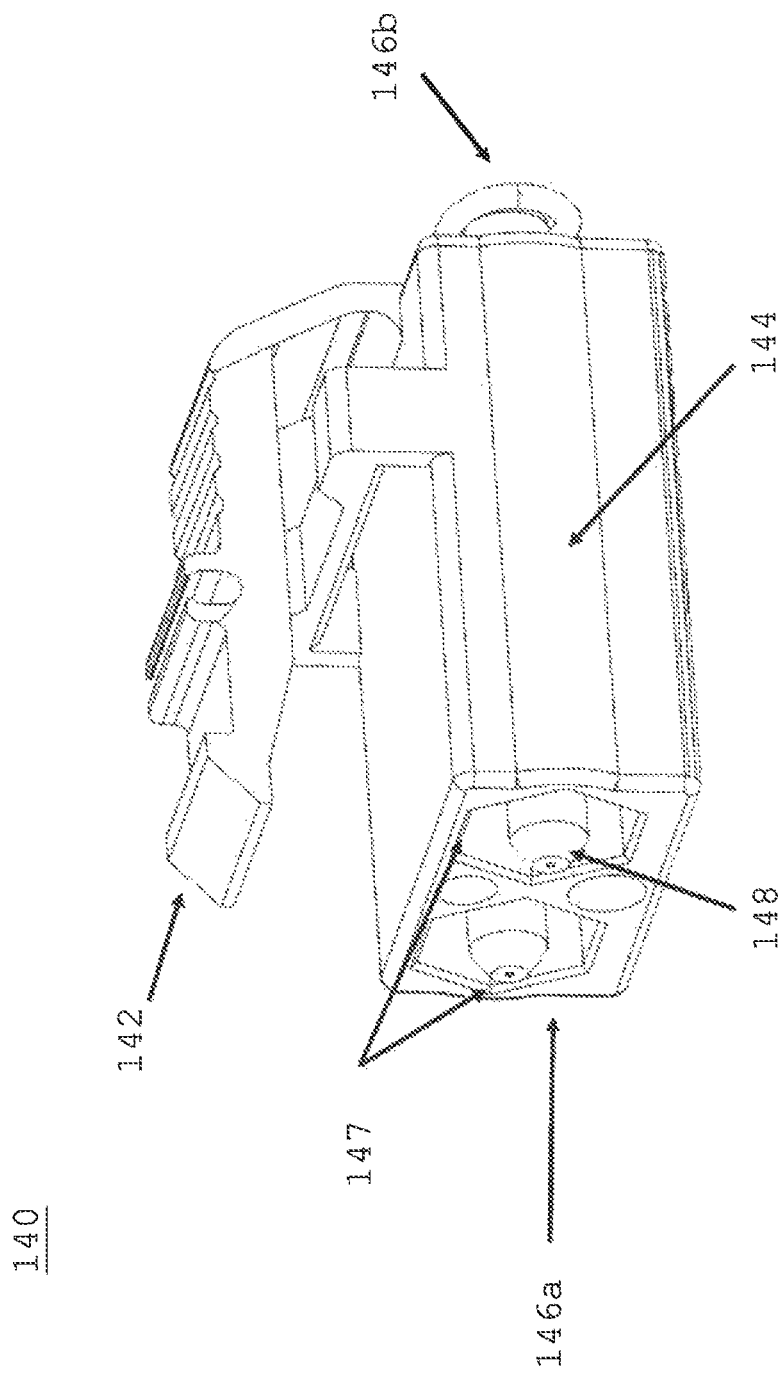
FIG. 1F is a perspective view of a multi-fiber optic ferrule connector that can be secured in an end of the adapter of FIG. 1A without an engagement device.
Figure 4:
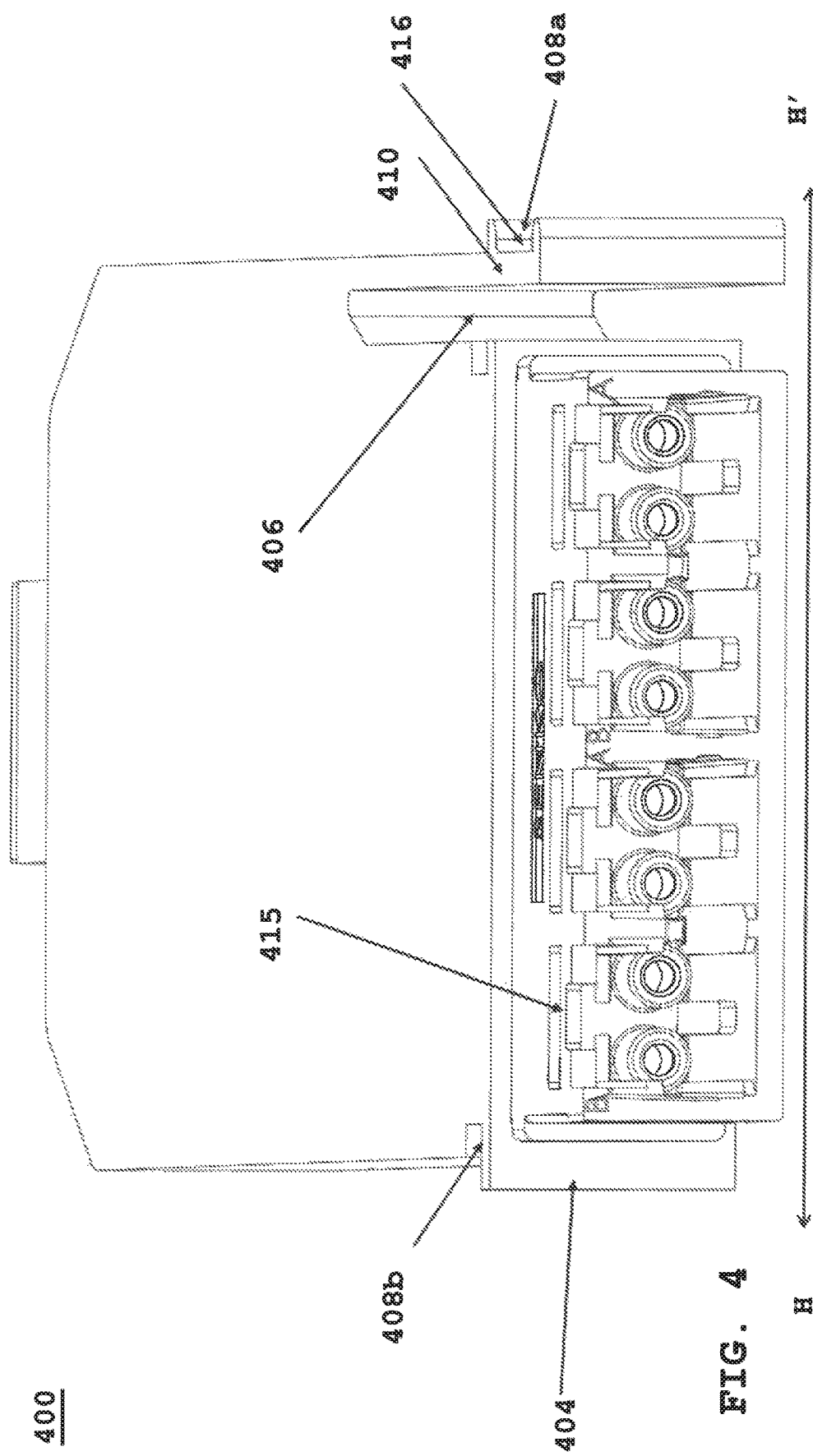
FIG. 4 depicts a front perspective view of cassette according to a second embodiment of the present invention.

FIG. 1F depicts a perspective view of an alternative fiber optic connector 140. Connector 140 is inserted in a second end of adapter 100 without engagement device 120. Referring to FIGS. 1F and 4, latch 142 is depressed and seats within adapter housing opening 415 to secure connector 140 in an adapter receptacle. Referring to FIG. 1F, connector housing 144 mates with upper rail 712b and inner rail 713b to align connector 140 into adapter receptacle that allows latch 142 to be secured within opening 774.

Referring to FIG. 1D, the adapter 100 is assembled in the direction of arrow "A". Alignment sleeves 114c are inserted into adapter housing between a first and a second end. Alignment sleeve holder 114 accepts one end of the alignment sleeve, and alignment sleeve holder 114 is secured within corresponding adapter structure in housing 110 within a receptacle port 110a. Referring to FIG. 1H.1, integrated engagement devices (102a, 102b) are molded as one integrated piece into an adapter receptacle inner housing structure as disclosed in U.S. Patent US20180259717A1 Takano owned by the assignee of the present invention. The replaceable engagement devices (102a, 102b) are secured with corresponding inner adapter housing structure.

Figure 1G:
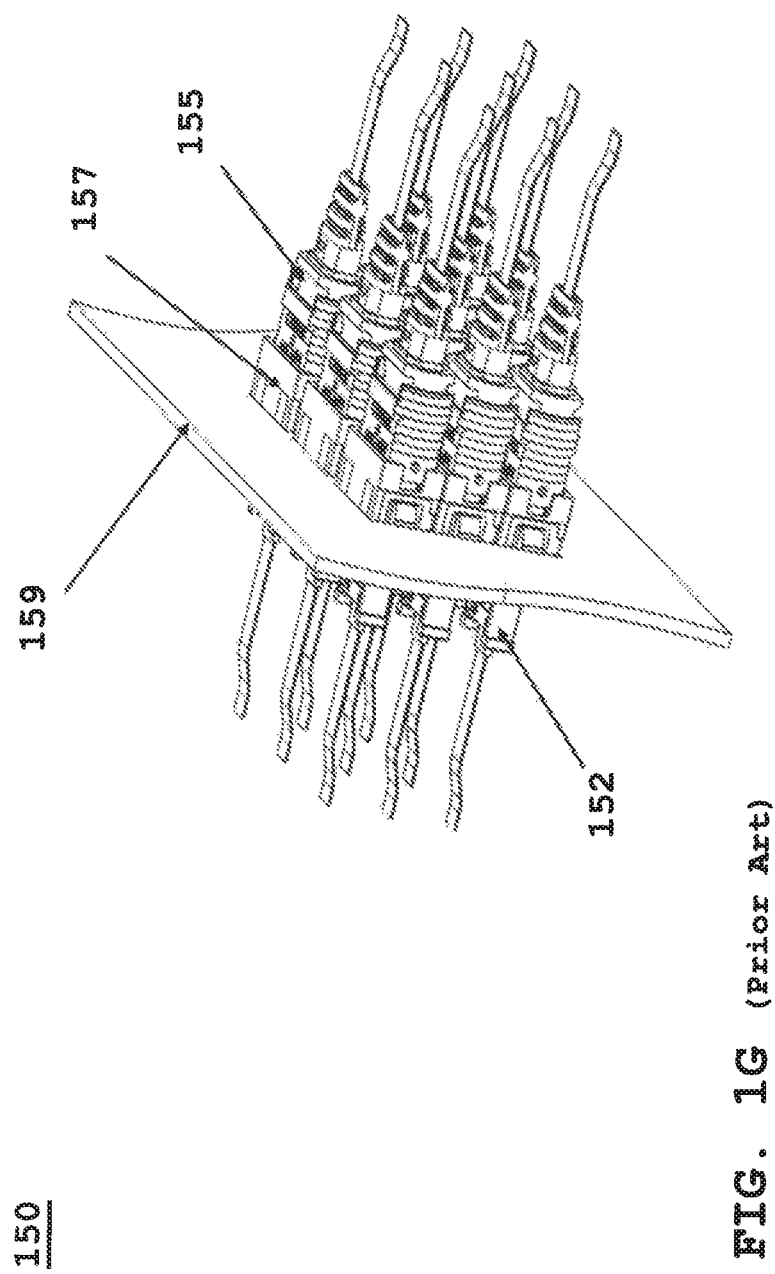
FIG. 1G is a perspective view of a plural of fiber optic MPO connectors individually integrated within a patch panel.

FIG. 1G depicts patch panel 150 found in the prior art with a plural of single receptacles 157 holding fiber optic connector 155, in this view a MPO connector. Each receptacle and connector assembly is secured to structure 159 or panel. The MPO connector is in communication with another connector 152 or cable on an opposing side of the panel.

FIG. 1H.2 is a front view of adapter 100 with a cross-section along A-A along a longitudinal axis, L-L, from a first end to a second end of the adapter. FIG. 1H.1 is a cross-section along A-A shows engagement device 102a molded as part of inner housing 110a of the adapter 100 at the first end, as shown in cross-section.

Figure 2:
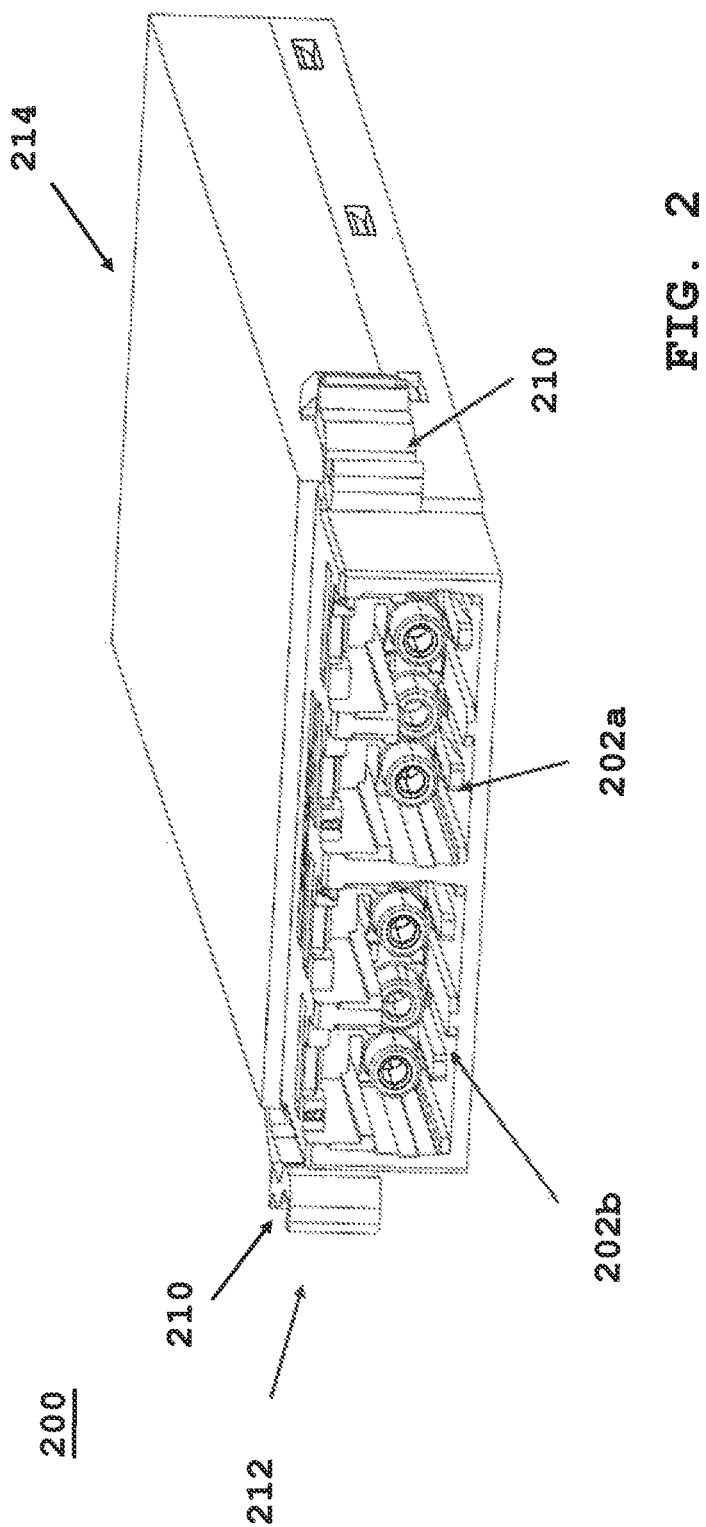
FIG. 2 depicts a cassette, according to the present invention, with a plural of fiber optic receptacles similar to FIG. 1A at a first end.

FIG. 2 depicts cassette 200 with a plural of dual port receptacles (202a, 202b) at first end 212. A second end 214 may have a plural of receptacles (not shown) to accept fiber optic connectors of the same or different type than at first end 212. Receptacle port (202a, 202b) may be of similar structure as shown in FIG. 1D. As described above in FIG. 1F, connector 140 may be accepted in a port of receptacle port (202a, 202b), or if securing/engagement device (102a, 102b) is inserted into receptacle port (202a, 202b), connector 130 may be secured in said receptacle assembly besides side connector 140 in a second receptacle, where second receptacle does not have a securing engagement device within said port of the receptacle. As described above connectors (130, 140) are secured within the receptacle. One or more latches 210 are used to secure cassette within a panel wall or supporting structure 159.

Figure 3:
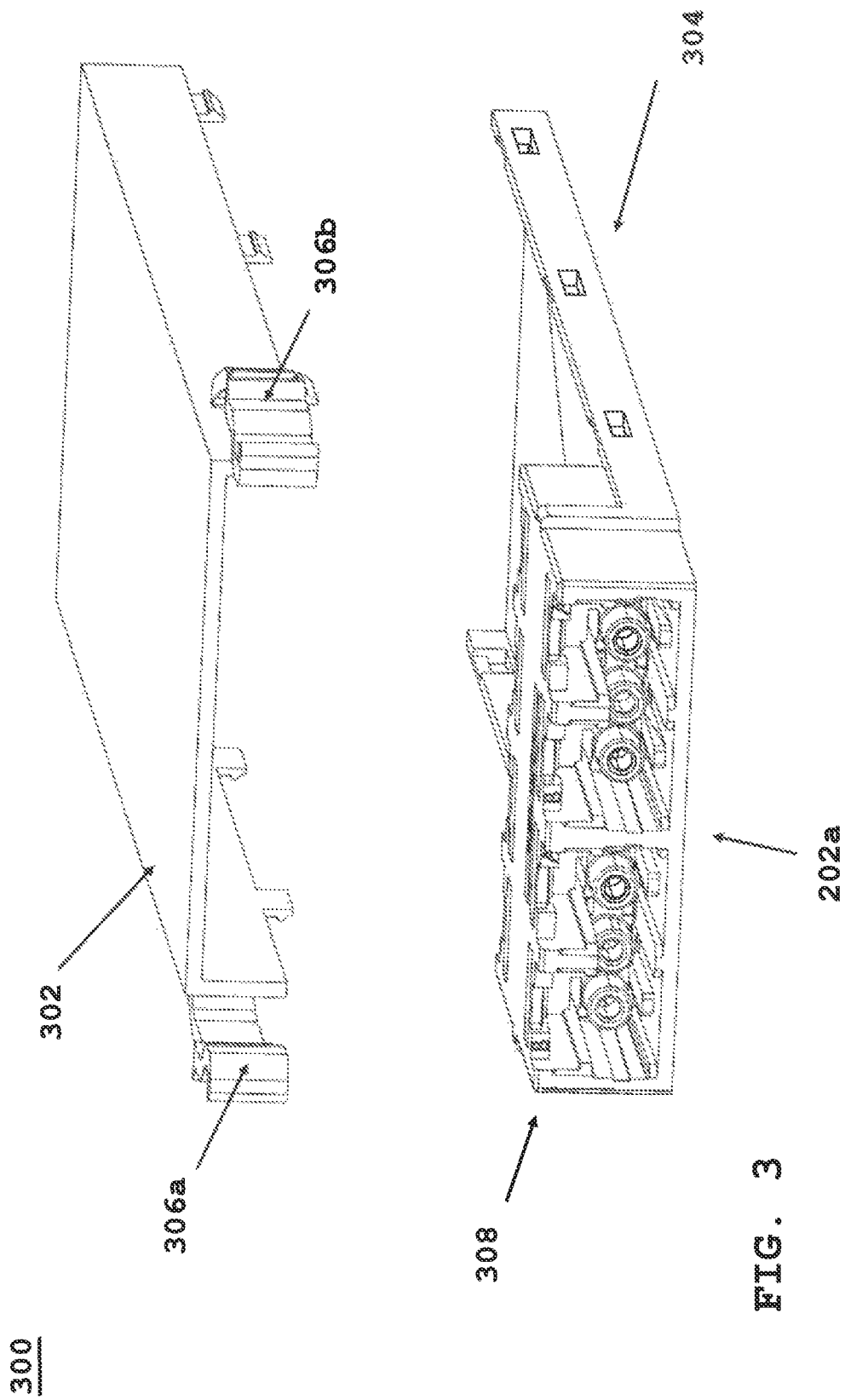
FIG. 3 depicts FIG. 2 exploded with a top portion of cassette housing and bottom portion of cassette housing.

FIG. 3 depicts cassette 200 with top portion 302 detachable from bottom portion 304. Top portion 302 may contain a pair of opposing clip latches (306a, 306b) that are used to secure cassette 100 within a patch panel wall. First end 212 (refer to FIG. 2) shows a pair of dual port receptacles 308 ganged together to form a four port receiving assembly 202a for a plural of the same or different fiber optic connectors.

FIG. 4 depicts a front view of an alternative embodiment of a cassette with flat latch 410 and flange 404 to secure cassette 400 to a patch panel. Flat latch 410 further comprises recess 406 and vertical cut-outs (408a, 408b). Upon inserting into an opening size slightly smaller than an outer horizontal dimension, as shown by arrow "H-H", flat latch 410 is depressed into recess 406 opening and with cut-outs (408a, 408b) configured to engage wall thickness (not shown) and within said cut-out 408a, upon full insertion latch 410 relaxes and under its spring force pushes back onto wall thickness, along securing surface 416, thereby latching cassette 400 within said panel. Flange 404 with its corresponding cut-out 408b to accept panel wall thickness, thus flange 404 helps prevent cassette 400 from being pushed through panel opening.

Figure 5:
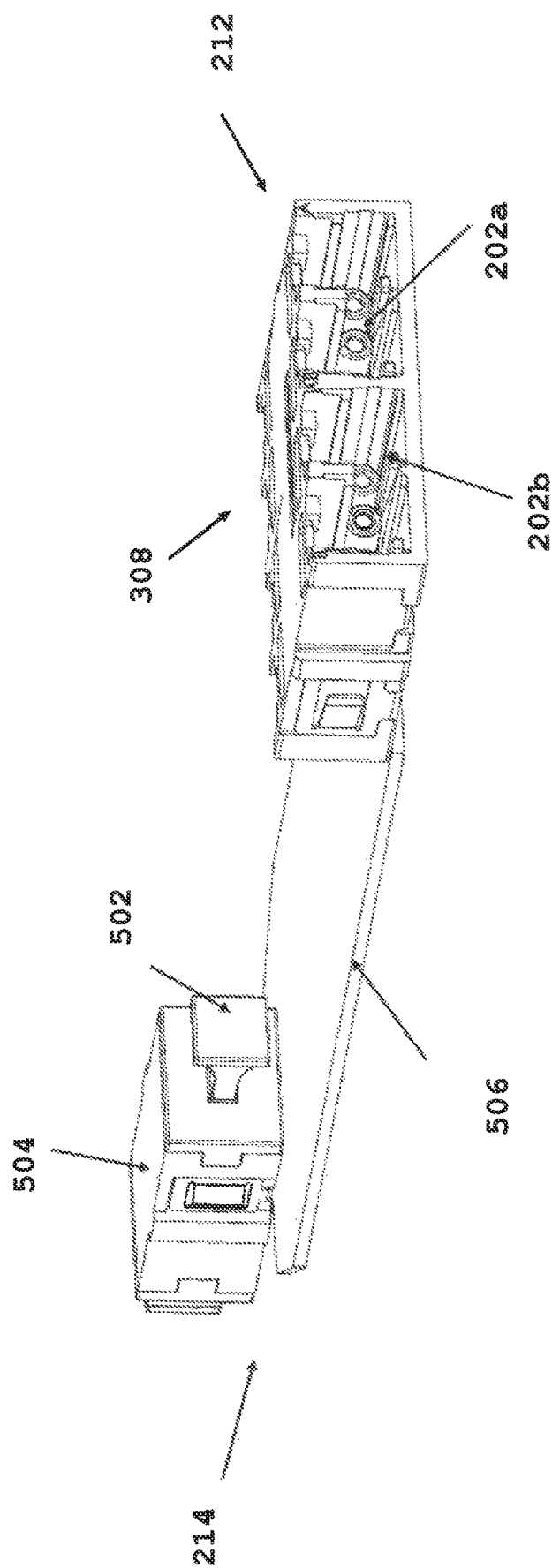
FIG. 5 depicts an interior of the cassette of FIG. 2 or FIG. 3.
Figure 6:
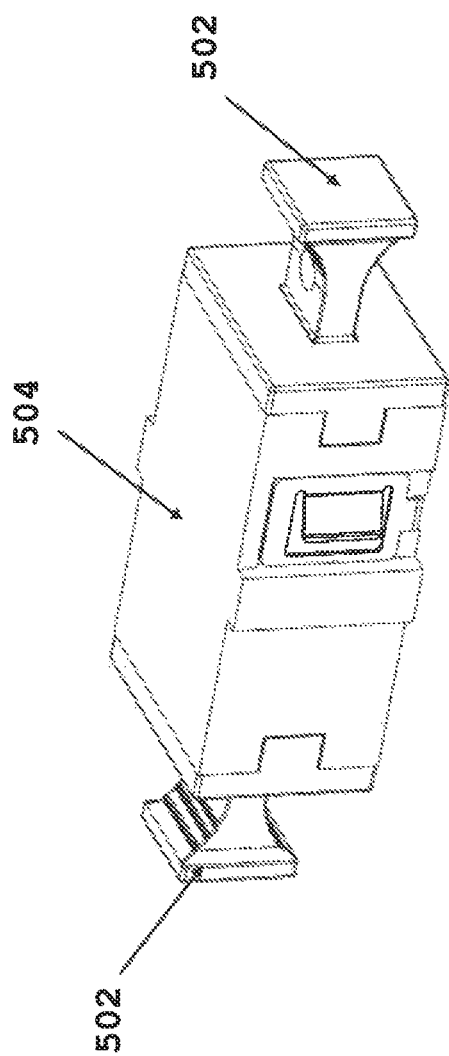
FIG. 6 depicts a dust cap covering a fiber optic receptacle a second end of a cassette.
Figure 7:
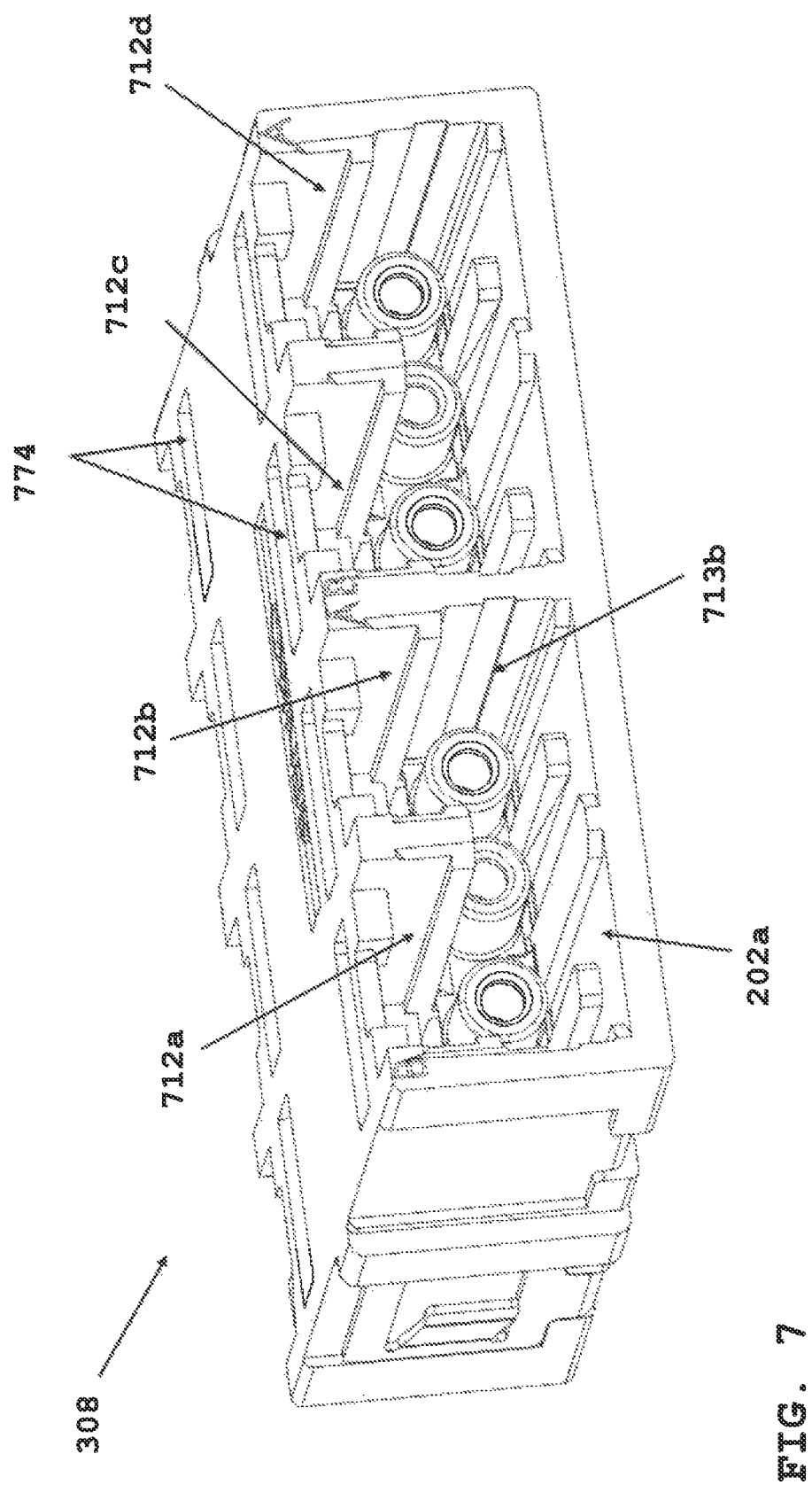
FIG. 7 depicts a perspective view of a plural of receptacles a first end of a cassette.
Figure 8:
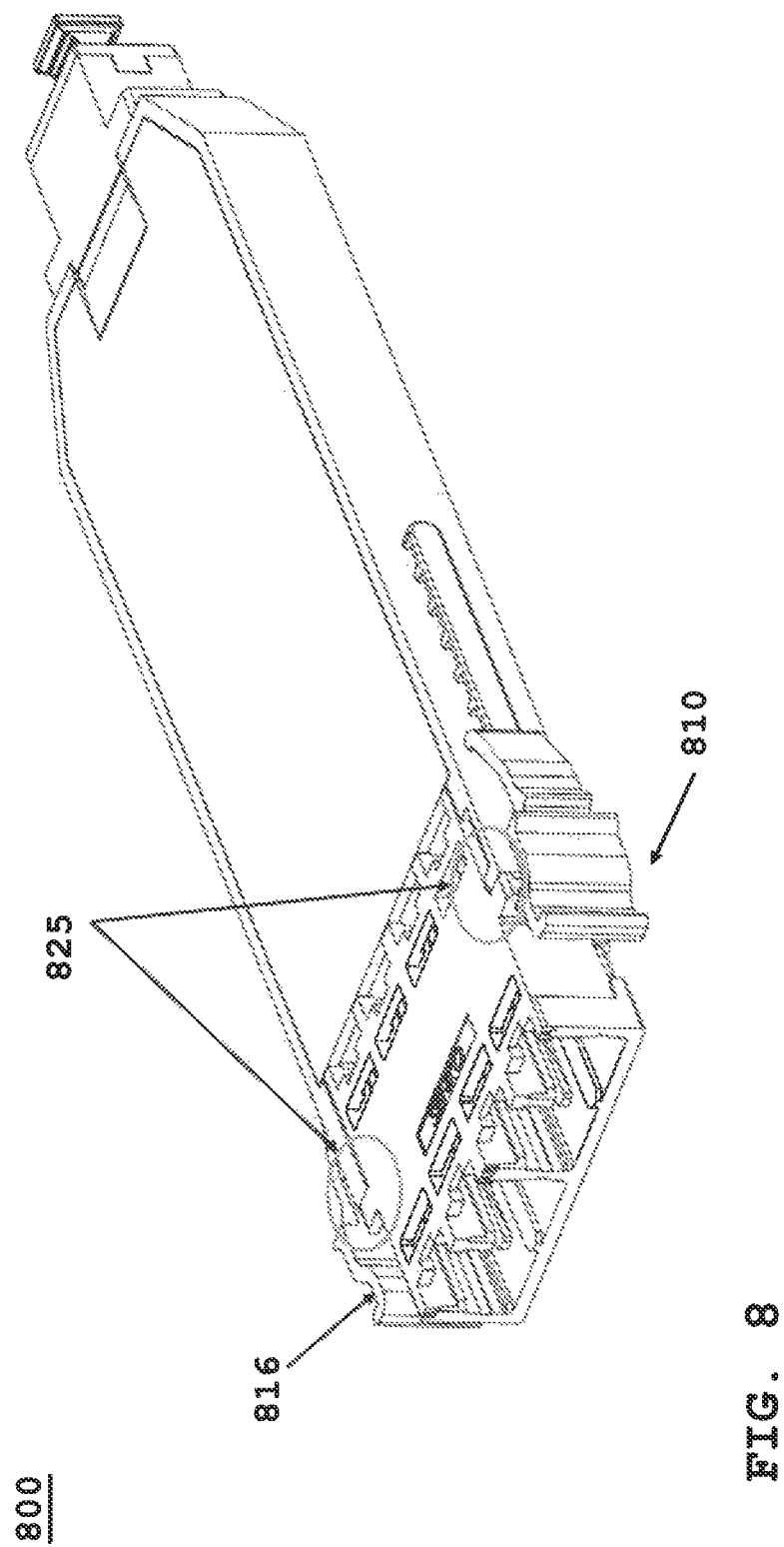
FIG. 8 depicts a third embodiment of a cassette with a plural of receptacles at a first end.

FIG. 5 depicts interior of cassette (200, 400) with top portion not shown. Base plate 506 holds a plural of receptacles (202a, 202b) at first end 212 and at second end 214 is second receptacle 504 type with dust cap 502 at either port of said receptacle 504. In this view receptacle 504 can accept MPO connector 155, but connector 140 or connector 130 can be secured therein without departing from the scope of the invention. First end 212 secures a pair of dual port receptacles 308 to base plate 506. FIG. 6 depicts MPO adapter or receptacle 504 with dust cap 502 insert at opposing ports of receptacle 504. FIG. 7 depicts a pair of dual port receptacles 308. Engagement device (102a, 102b) may be inserted into one or more ports using rail support (712a-712b) respectively, and as shown in FIGS. 1A-1A.2. FIG. 8 depicts another embodiment of cassette 800 that secures receptacle 308 at a first end using a press fit within opening of cassette 800. Cassette 800 has a pair of latches 810 with corresponding securing surfaces 816 that secure cassette within panel wall or supporting structure as described above. Top portion and bottom of the cassette are secured together 825.

Figure 9:
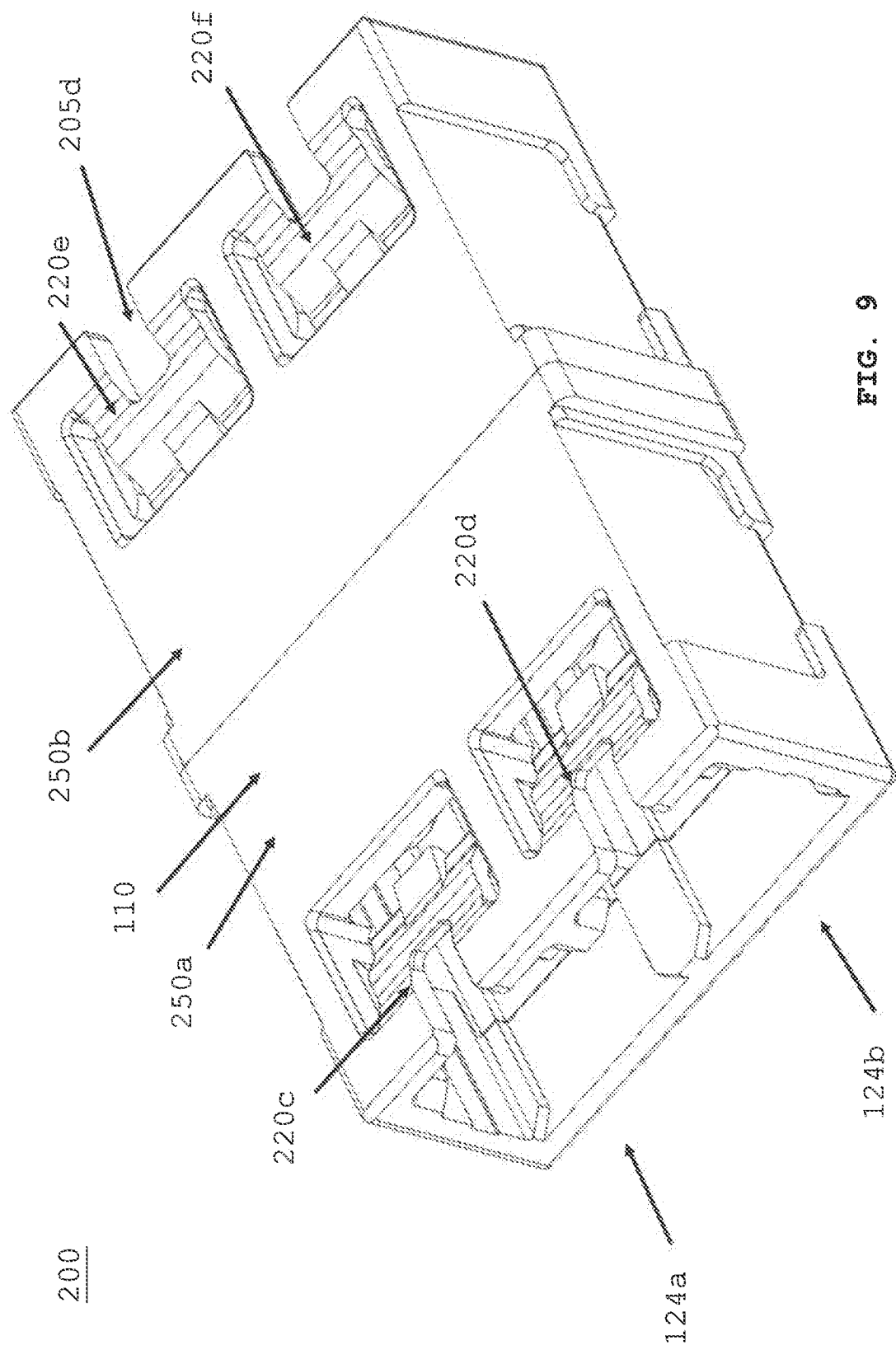
FIG. 9 depicts a second embodiment of an integrated engagement device used in an adapter or cassette.

FIG. 9 depicts another embodiment of an integrated engagement device. A front body portion 250a and back body portion 250b form adapter 200. Adapter ports (124a-124d) further comprise an integrated engagement device (220c-220f) for accepting fiber optic connector 130 therein. Adapter ports further comprise an alignment slot (205d, 205f) for accepting an alignment key on an outer housing of fiber optic connector 130 for ensuring alignment and correct polarity when the connector is inserted into the port.

What is claimed is:

1. A cassette comprising:
   a housing with a top portion and a bottom portion; the top portion being releasably attached to the bottom portion; the housing having a first end, a second end, and a length extending from the first end to the second end;
   one or more receptacles at a first end;
   and one or more receptacles at a second end; and
   wherein a first receptacle of said one or more receptacles at the first end and a second receptacle of said one or more receptacles at the second end is configured to secure a first connector and a second connector, respectively, and further wherein each of the first connector and the second connector is of a type including an optical fiber ferrule and the first connector is not the same type as the second connector;
   wherein the housing comprises a gap extending lengthwise from the first receptacle to the second receptacle such that the first and second connectors are spaced apart by the gap when received in the first and second receptacles.

2. A cassette according to claim 1, wherein the first receptacle comprises a removeable engagement device within the first receptacle configured to secure the first connector within the first receptacle.

3. A cassette according to claim 1, wherein the first connector is secured within the first receptacle with a removable engagement device therein and the second connector is secured within the second receptacle with an integrated engagement device therein.

4. A cassette according to claim 1, wherein said one or more receptacles at the first end comprises the first receptacle and another receptacle.

5. A cassette according to claim 1, wherein said one or more receptacles at the second end comprises at least two receptacle ports.

6. A cassette according to claim 1, further comprising an engagement device received in the first receptacle, the engagement device comprising a pair of outer arms connected to a middle arm,
   wherein inserting a first connector into the first receptacle flexes the middle arm, which further flexes the outer arms, and
   wherein upon full insertion of the first connector within the first receptacle, the outer arms return to an unflexed position secured within a recess on an outer housing of the first connector, thereby securing the first connector within the first receptacle.

7. A cassette comprising:
   a housing comprising a top portion and a bottom portion releasably attachable to the bottom portion, the housing having a first end, a second end, and a length extending from the first end to the second end;
   a receptacle at first end of the housing configured to receive a connector; and
   an engagement device received in the receptacle, the engagement device comprising a pair of outer arms connected to a middle arm, the middle arm being configured to be deflected by the connector as the connector is inserted into the receptacle, the outer arms being configured to deflect as the middle arm is deflected and rebound when the connector is received in the receptacle such that the outer arms are received in a recess of the connector and latch the connector in the receptacle.

* * * * *